US011230822B1

United States Patent
Cliff et al.

(10) Patent No.: US 11,230,822 B1
(45) Date of Patent: Jan. 25, 2022

(54) EFFICIENT HYDRAULIC SUPPLY SYSTEMS AND METHODS FOR WORK VEHICLES

(71) Applicant: Deere & Company, Moline, IL (US)

(72) Inventors: Michael J. Cliff, Coffeyville, KS (US); Steven R. Fliearman, Coffeyville, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/934,345

(22) Filed: Jul. 21, 2020

(51) Int. Cl.
*E02F 9/22* (2006.01)
*E02F 9/20* (2006.01)

(52) U.S. Cl.
CPC .......... *E02F 9/2296* (2013.01); *E02F 9/2075* (2013.01); *E02F 9/2292* (2013.01); *B60Y 2200/41* (2013.01)

(58) Field of Classification Search
CPC ................ E02F 9/2292; F16H 61/0031; F16H 2061/0034; F16H 61/0021
See application file for complete search history.

(56) References Cited

U.S. PATENT DOCUMENTS

| 8,347,618 B2 | 1/2013 | Dostal et al. |
| 9,435,384 B2 * | 9/2016 | Bunder .................... F16H 63/18 |
| 9,581,177 B2 * | 2/2017 | Schuller ................ F15B 15/202 |

\* cited by examiner

*Primary Examiner* — Abiy Teka
(74) *Attorney, Agent, or Firm* — Tucker Ellis, LLP

(57) ABSTRACT

A hydraulic supply system provides hydraulic power to functional systems of a work vehicle and includes first and second hydraulic circuits. The first hydraulic circuit includes a first fluid pump operable to generate a first hydraulic fluid, a pressure storage reservoir coupled with the first fluid pump, and a first port coupled with the first fluid pump and with the pressure storage reservoir operable to store a reserve hydraulic fluid. The first port delivers a boost hydraulic fluid from the first circuit for use by the work vehicle to operate a first functional system of the work vehicle. The second hydraulic circuit includes a second fluid pump that generates a second hydraulic fluid, and a second port coupled with the second fluid pump delivers the second hydraulic fluid from the second hydraulic circuit for use by the work vehicle to operate a second functional system of the work vehicle.

19 Claims, 5 Drawing Sheets

EFFICIENT HYDRAULIC SUPPLY SYSTEMS AND METHODS FOR WORK VEHICLES

FIELD OF THE DISCLOSURE

The present disclosure is related to hydraulic systems and, more particularly, to hydraulic supply systems and methods providing improved efficiencies in vehicles. Although the descriptions herein are directed to hydraulic supply systems and methods controlling power shift transmissions in tractors and supplying lubrication and cooling oil to various powertrain components of tractor transmissions, it is to be appreciated that the claimed invention has a much broader range of applications including as examples, use in work vehicles of any type that use hydraulic supply systems for control, lubrication, cooling, and/or other functions in transmission components of the work vehicles.

BACKGROUND

Prior hydraulic supply systems and methods in work vehicles can sometimes be inefficient. This is due in part to tasking those systems with supporting an ever-increasing range of hydraulic power consuming systems, and the manufactures' willingness to integrate those power consuming systems into vehicles to satisfy customer demands for additional diverse functionalities. The hydraulic supply systems must also be able to support basing improvements made in the vehicle product offerings.

As an example, a hydraulic supply system that is used for providing high volume oil at a low continuous pressure to support lubrication and cooling functions in the work vehicle, might also be additionally tasked with servicing the periodic low volume high pressure demands of power shifting control functions of the work vehicle transmission for certain vehicle configuration packages or use configurations.

By way of background. FIG. 1 shows a representative prior hydraulic supply system 10 to illustrate the manner in which these inefficiencies may occur. The hydraulic supply system 10 supplies hydraulic fluid power to a control unit 20 of a power shift transmission 22 of a work vehicle 1. The hydraulic supply system 10 also supplies hydraulic fluid power to a set of one or more lubrication and cooling systems 30 of the work vehicle 1.

The hydraulic supply system 10 includes a prime mover element such as, for example, a motor 11 driving a pump 12 for supplying hydraulic oil under pressure to a regulator 13 via a supply line 14 including flow control devices such as a check valve 15 for example.

The regulator 13 interfaces the pump 12 with the control 20 of the power shift transmission 22 of the work vehicle via a transmission supply line 23, and also interfaces the pump 12 with the set of one or more lubrication and cooling systems 30 of the work vehicle via a lubrication supply line 31.

In typical work vehicle applications such as in farming tractors, for example, the control 20 of the power shift transmission 22 may require a supply of oil delivered at a high pressure in order to effect shifting operations in the transmissions, but usually only intermittently and only for short periods of time. A nominal example is 30 gallons per minute (GPM) delivered at 300 pounds per square inch (PSI) for about 500 ms.

Also in typical work vehicle applications such as in farming tractors, for example, the lubrication and cooling system 30 may require, nominally, oil delivered during operation of the tractor at a rate of about 10 GPM, and at a pressure of about 45 PSI.

As a practically matter, the pump 12 of the hydraulic supply system 10 must be sized to support the possibly simultaneous demands of both the control 20 of the power shift transmission 22 as well as the lubrication and cooling system 30 such as may occur during heavy use of the vehicle when both systems might operate at full use or duty cycle. That is, the pump 12 is typically sized to deliver the aggregate of the maximum overall volumes required and also to deliver the aggregate of the maximum of the overall pressures required. In the particular example, the pump 12 is therefore sized to supply about 40 GPM at about 300 PSI. The regulator 13 regulates down this high volume, high pressure supply to the appropriate levels as may be required locally by the control 20 of the power shift transmission 22 and the lubrication and cooling system 30. The regulator dumps extra unused oil to a return 16 via a return line 17. Operating in this mode the pump 12 might draw or otherwise consume about 5,000 Watts of power on a continual basis. Alternatively, the "extra" flow of the high volume pump can be dumped "over relief" and directed to line 31 to the lubrication and cooling system 30 to lubricate and potentially cool the transmission and thus removing the need for line 17. There is still a direct energy loss as this newly pressurized oil such as at, for example, 300 psi, is now dropped in pressure such as to, for example, 45 psi, and sent to the transmission 22 as low pressure lube and cooling flow. The energy of the pressure drop is converted to heat in the oil and thus may require additional cooling of the oil.

In the example, a relatively large displacement, relatively high pressure pump 12 is therefore required. Alternatively, a large variable pump capable of delivering the required aggregate of the pressures and flows may be specified for the application. In either case, however, it could be considered inefficient to provide a hydraulic supply system that stands ready at all times to deliver oil at a high pressure and volume when the high pressure is needed only intermittently, and only by a few (one in the example) fluid consumers. In essence, in the example, the prior hydraulic supply system 10 including both the pump 12 and the motor 11 sized to drive the pump 12, is sized overall to support peak power loading even though these peak demands may be relatively short-lived and infrequently experienced such as may occur during shifting of the transmission 22 or the like during heavy use of the vehicle.

It is therefore desirable to provide efficient hydraulic supply systems and methods to supply hydraulic power to functional systems of associated work vehicles such as tractors, for example.

It is further desirable to provide efficient hydraulic supply systems and methods that can simultaneously support both high pressure, low volume hydraulic power consuming loads, and low pressure, high volume hydraulic power consuming loads in work vehicles such as tractors.

It is further desirable to provide efficient hydraulic supply systems that can simultaneously support both the high pressure, low volume hydraulic, and the low pressure, high volume hydraulic power consuming loads in the work vehicles that are relatively smaller and more efficient than the prior large displacement, high pressure hydraulic supply systems that were otherwise required to supply hydraulic power to those loads.

SUMMARY

The embodiments herein provide efficient hydraulic supply systems and methods to supply hydraulic power to functional systems of associated work vehicles such as tractors, for example.

The embodiments herein further provide efficient hydraulic supply systems and methods that can simultaneously support both high pressure, low volume hydraulic power consuming loads, and low pressure, high volume hydraulic power consuming loads in work vehicles such as tractors.

The embodiments herein still further provide efficient hydraulic supply systems that can simultaneously support both the high pressure, low volume hydraulic, and the low pressure, high volume hydraulic power consuming loads in the work vehicles that are relatively smaller and more efficient than the prior large displacement, high pressure hydraulic supply systems that were otherwise required to supply hydraulic power to those loads.

In one aspect, the hydraulic supply system operating to provide hydraulic power to functional systems of an associated work vehicle includes first and second hydraulic circuits. The first hydraulic circuit includes a first fluid pump operable to generate a first hydraulic fluid, a pressure storage reservoir coupled with the first fluid pump, and a first port coupled with the first fluid pump and with the pressure storage reservoir. The pressure storage reservoir is operable to store a reserve hydraulic fluid. The first port is operable to deliver a boost hydraulic fluid from the first circuit for use by the associated work vehicle to operate a first functional system of the work vehicle, wherein the boost hydraulic fluid includes a combination of one or more of the first hydraulic fluid and/or the reserve hydraulic fluid. The second hydraulic circuit includes a second fluid pump operable to generate a second hydraulic fluid, and a second port coupled with the second fluid pump. The second port is operable to deliver the second hydraulic fluid from the second hydraulic circuit for use by the associated work vehicle to operate a second functional system of the work vehicle.

In a further aspect, the hydraulic supply system further includes a first electric motor coupled with the first fluid pump, and a second electric motor coupled with the second fluid pump. The first electric motor is operable to drive the first fluid pump to generate the first hydraulic fluid, and the second electric motor is operable to drive the second fluid pump to generate the second hydraulic fluid for use by the associated work vehicle to operate the second functional system of the work vehicle.

In accordance with a further aspect, the first electric motor drives the first fluid pump independently of the second electric motor.

In accordance with a further aspect, the pressure storage reservoir is a hydraulic accumulator.

In accordance with a further aspect, the hydraulic supply system includes an interface device operatively coupling the first fluid pump with an associated drivetrain component of the associated work vehicle, and an electric motor coupled with the second fluid pump. The interface device is operable to drive the first fluid pump to generate the first hydraulic fluid, and the electric motor is operable to drive the second fluid pump to generate the second hydraulic fluid for use by the associated work vehicle to operate the second functional system of the work vehicle.

In accordance with a further aspect, the hydraulic supply system includes a control system operably coupled with the first electric motor, and a pressure sensor operably coupled with the control system. The pressure sensor is operable to sense a pressure of the reserve hydraulic fluid within the accumulator, and to generate a pressure signal representative of the sensed pressure. The first electric motor is responsive to the command signal to drive the first fluid pump to generate the first hydraulic fluid in accordance with the command signal.

In accordance with a further aspect, the first functional system of the hydraulic supply system includes a shift control for a power shift transmission of the associated work vehicle, and the second functional system of the hydraulic supply system includes a lubrication and cooling system of the associated work vehicle.

In a further aspect, a method of operating a hydraulic supply system provides hydraulic power to functional systems of an associated work vehicle. The method includes generating a first hydraulic fluid by operating a first fluid pump of a first hydraulic circuit of the hydraulic supply system. The method further includes storing a reserve hydraulic fluid in a pressure storage reservoir coupled with the first fluid pump. The method further includes delivering a boost hydraulic fluid from the first circuit via a first port coupled with the first fluid pump and with the pressure storage reservoir, the boost hydraulic fluid from the first circuit being for use by the associated work vehicle to operate a first functional system of the work vehicle, wherein the boost hydraulic fluid comprises a combination of the first hydraulic fluid and the reserve hydraulic fluid. The method further includes generating a second hydraulic fluid by operating a second fluid pump of a second hydraulic circuit of the hydraulic supply system. The method further includes delivering the second hydraulic fluid via a second port coupled with the second fluid pump, the second hydraulic fluid from the second hydraulic circuit being for use by the associated work vehicle to operate a second functional system of the work vehicle.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

DETAILED DESCRIPTION

The following describes one or more example embodiments of the disclosed hydraulic supply systems and methods for work vehicles, as shown in the accompanying figures of the drawings described briefly above. Various modifications to the example embodiments may be contemplated by one of skill in the art.

Figure 1:
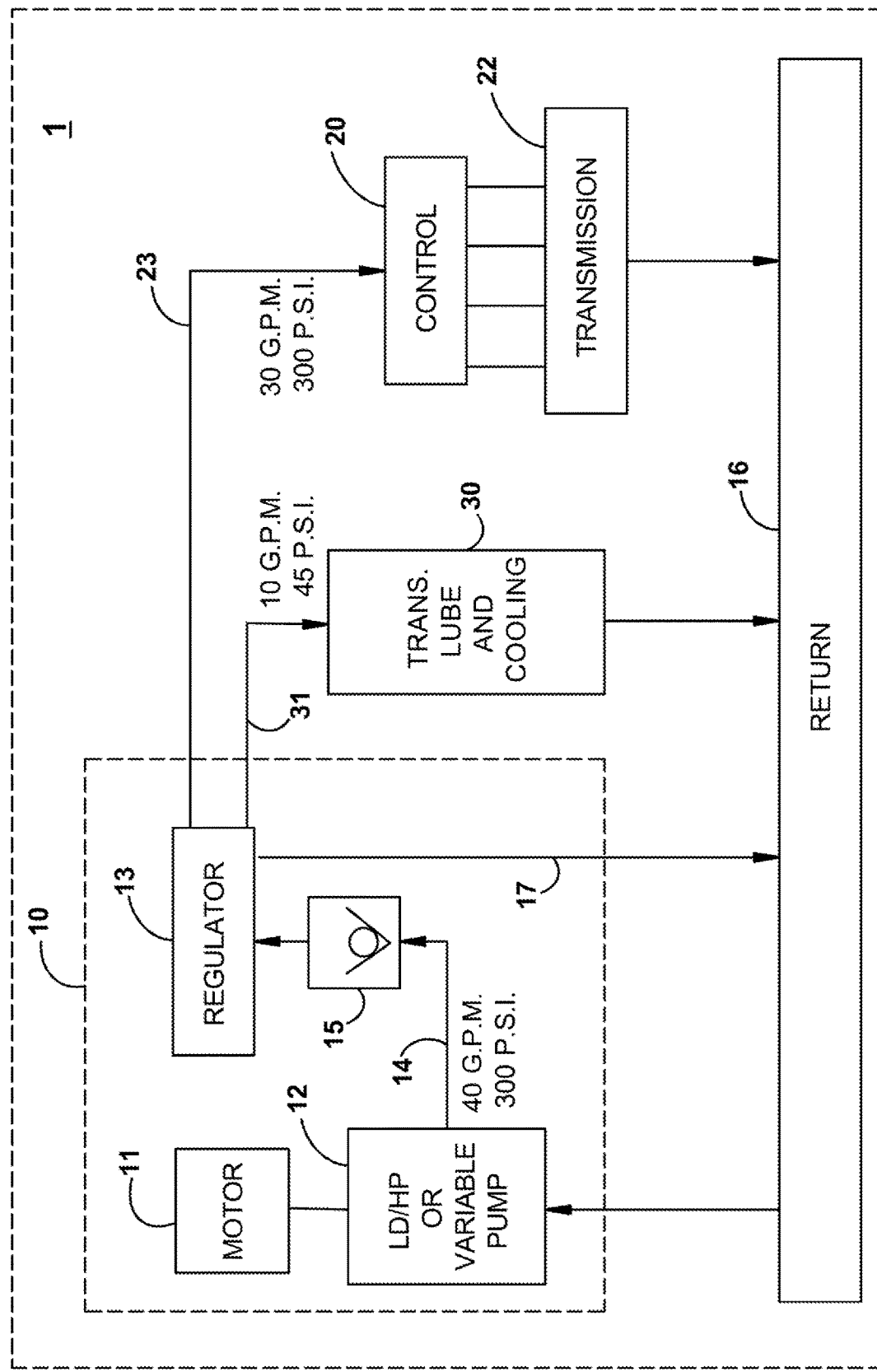
FIG. 1 is a schematic illustration showing a hydraulic supply system disposed in a work vehicle as taught in the art.
Figure 2:
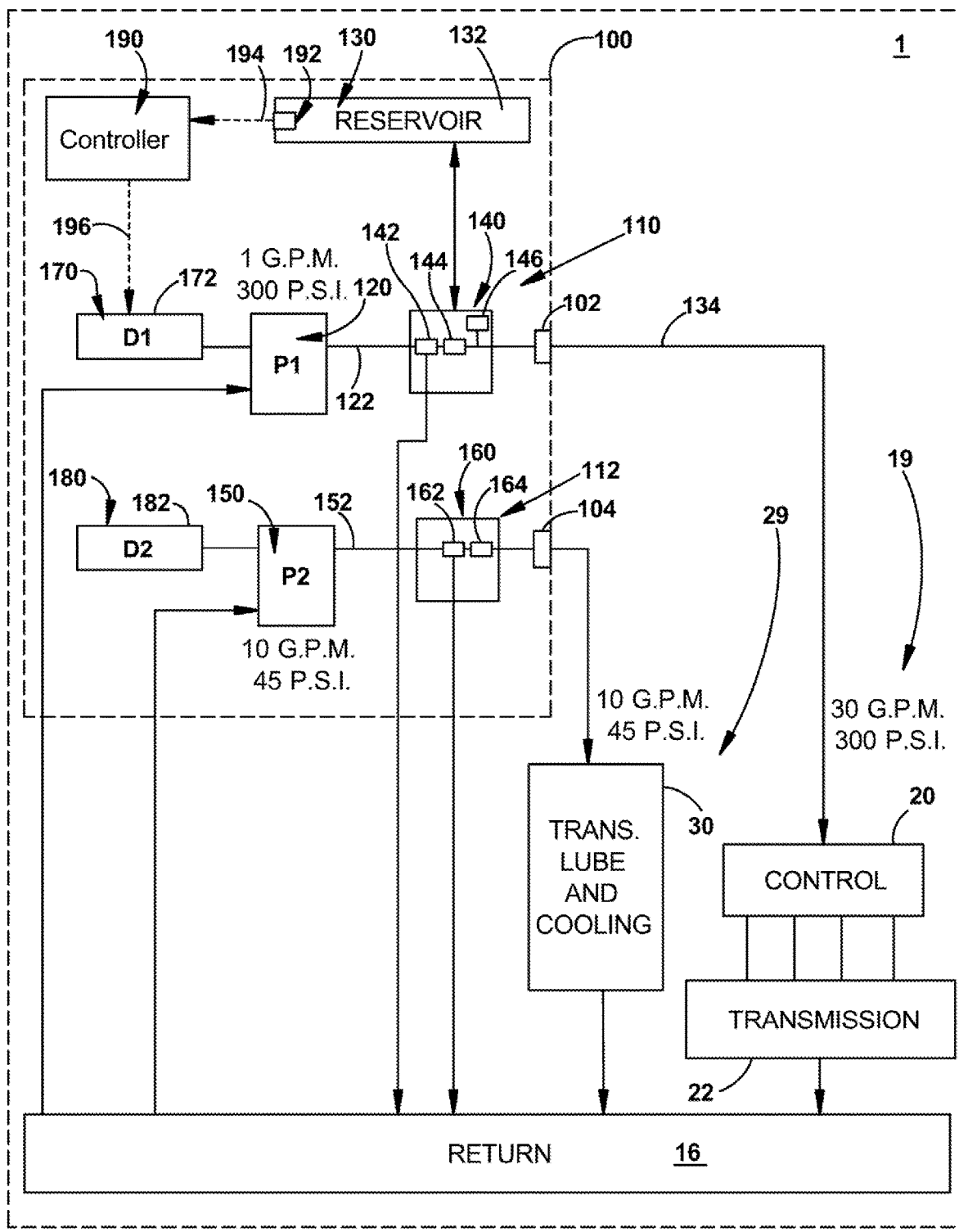
FIG. 2 is a schematic illustration showing a hydraulic supply system disposed in an associated work vehicle in accordance with an example embodiment.

FIG. 2 is a schematic illustration showing a hydraulic supply system 100 disposed in an associated work vehicle 1 in accordance with an example embodiment. The hydraulic supply system 100 of the example embodiment supplies hydraulic fluid power to functional systems 19, 29 of an associated work vehicle 1 including for example supplying hydraulic fluid power to a first functional system 19 including a control unit 20 controlling shifting of a power shift transmission 22 of the work vehicle 1, and also supplying hydraulic fluid power to a second functional system 29 including to a set of one or more lubrication and cooling systems 30 of the work vehicle 1.

The hydraulic supply system 100 includes a set of hydraulic circuits for this purpose including in particular first and second hydraulic circuits 110, 112 that are each separately and independently operable to supply hydraulic power to the functional systems 19, 29 of the associated work vehicle 1 in accordance with the example embodiment. That is, and as shown, the first hydraulic circuit 110 supplies hydraulic fluid power to the first functional system 19 including in the example embodiment the control 20 of the power shift transmission 22 of the work vehicle 1, and the second hydraulic circuit 112 supplies hydraulic fluid power to the second functional system 29 including in the example embodiment the set of one or more lubrication and cooling systems 30 of the work vehicle 1.

In the example, the first hydraulic circuit 110 includes a first fluid pump 120 operable to generate a first hydraulic fluid 122, and a pressure storage reservoir 130 coupled with the first fluid pump 120. The pressure storage reservoir 130 is operable to store a reserve hydraulic fluid 132. In accordance with a particular example embodiment, the pressure storage reservoir 130 is a hydraulic accumulator 132. The first hydraulic circuit 110 further includes a first port 102 coupled with the first fluid pump 120 and with the pressure storage reservoir 130 via a first regulator circuit 140. The first port 102 in the example embodiment is operable to deliver a boost hydraulic fluid 134 from the first circuit 110 for use by the associated work vehicle 1 as may be required or necessary to operate the first functional system 19 including in the example embodiment the control 20 of the power shift transmission 22 of the work vehicle 1 from time to time such as to shift the transmission 22 for example. The boost hydraulic fluid 134 comprises a combination of the first hydraulic fluid 122 and the reserve hydraulic fluid 132 from the pressure storage reservoir 130. It is to be appreciated that at times when the first pump 120 may be off or otherwise not running, the boost hydraulic fluid 134 may be formed of or otherwise comprise substantially or wholly the reserve hydraulic fluid 132 with little or no contribution from the first hydraulic fluid 122. It is further to be appreciated that at times when the first pump 120 may be on or otherwise operating and running, the boost hydraulic fluid 134 may be formed of or otherwise comprise substantially mostly the reserve hydraulic fluid 132 with some contribution from the first hydraulic fluid 122.

The first regulator circuit 140 may be disposed in the first hydraulic circuit 110 for providing fluid flow control of the first hydraulic fluid 122 and the reserve hydraulic fluid 132 before they are blended to form the boost hydraulic fluid 134. The first regulator 140 may include a first pressure regulator device 142 for selectively dumping portions of the first hydraulic fluid 122 when it exceeds a predetermined selectable setpoint in order to regulate the pressure delivered to the first functional system 19 including in the example embodiment the control 20 of the power shift transmission 22 of the work vehicle 1 and to the pressure storage reservoir 130. Alternatively, the flow 122 of the first fluid pump 120 can be dumped "over relief" and directed to the lubrication and cooling system 30 to lubricate and potentially cool the transmission 22. There may still be a small energy loss as this newly pressurized oil such as at for example about 300 psi is now dropped in pressure to for example about 45 psi and sent to the transmission as low pressure lube and cooling flow for the lubrication and cooling system 30. The energy of the pressure drop is converted to heat in the oil and thus may benefit from additional cooling of the oil or the like. The first regulator may also include a check valve 144 for preventing backflow of hydraulic oil towards the first fluid pump 120, and an isolator valve 146 for isolating the pressure storage reservoir 130 from the remainder of the first hydraulic circuit 110. The isolator valve 146 is typically closed when the vehicle is not being operated, and is used to preserve the charge within the reservoir even when the vehicle is not in operation such as when stored, overnight, between work shifts, or the like.

A prime mover or drive element such as, for example, a first drive unit 170 is operably coupled with the first fluid pump 120, wherein the first drive unit 170 is operable to drive the first fluid pump 120 to generate the first hydraulic fluid 122. In a particular example embodiment, the first drive unit 170 may be a first electric motor 172 powered by a source of electrical power (not shown) for example. In yet a further particular example embodiment to be described in greater detail below, the first drive unit 170 may include an interface device 174 (FIG. 3) operatively coupling the first fluid pump 120 with an associated drivetrain component of the associated work vehicle, wherein the interface device is operable to drive the first fluid pump 120 to generate the first hydraulic fluid 122.

The hydraulic supply system 100 of the example embodiment further includes a second hydraulic circuit 112 comprising a second fluid pump 150 operable to generate a second hydraulic fluid 152, and a second port 104 coupled with the second fluid pump 150 via a second regulator circuit 160. The second port 104 is operable to deliver the second hydraulic fluid 152 from the second hydraulic circuit 112 for use by the associated work vehicle 1 to operate a second functional system 29 of the work vehicle 1. The second hydraulic circuit 112 supplies hydraulic fluid power to the second functional system 29 including in the example embodiment the set of one or more lubrication and cooling systems 30 of the work vehicle 1.

A prime mover or drive element such as, for example, a second drive unit 180 is operably coupled with the second fluid pump 150, wherein the second drive unit 180 is operable to drive the second fluid pump 150 to generate the second hydraulic fluid 152. In a particular example embodiment, the second drive unit 180 may be a second electric motor 182 powered by a source of electrical power (not shown) for example.

As described above, in typical work vehicle applications such as in farming tractors, for example, the control 20 of the power shift transmission 22 may require a relatively large volume of oil delivered at a relatively high pressure in order to effect shifting and other operations in the transmissions. However, these demands usually occur only intermittently and they also usually occur only for short periods of time. A nominal example is 30 gallons per minute (GPM) delivered at 300 pounds per square inch (PSI) for about 500 ms.

Also in typical work vehicle applications such as in farming tractors, for example, the lubrication and cooling system 30 may require, nominally, oil delivered during operation of the tractor at a rate of about 10 GPM, and at a pressure of about 45 PSI.

In order to support the possibly simultaneous demands of both the control 20 of the power shift transmission 22 as well as the lubrication and cooling system 30 such as may occur during heavy use of the vehicle, the example embodiments described herein use a unique set of techniques that in combination realize efficiencies heretofore unavailable in previous hydraulic supply systems. A first of the unique set of techniques of the example embodiment allocates the support responsibility for the control 20 of the power shift transmission 22 to the first hydraulic circuit 110, and the support responsibility for the lubrication and cooling system 30 to the second hydraulic circuit 112. A second of the unique set of techniques of the example embodiment stacks onto the first in that, rather than simply assigning the 30 GPM, 300 PSI load of the control 20 of the power shift transmission 22 to a pump and drive element combination capable of providing 30 GPM at 300 PSI, the example embodiments herein advantageously use a hydraulic circuit including small low volume pump in combination with a pressure storage reservoir such as a hydraulic accumulator. The small low volume pump may be a pump providing, for example, 1 GPM at 300 PSI and the accumulator may have a volume of about 1 gallon or about 4 liters.

Therefore, for the given loads as set out in the example embodiment of 30 GPM at 300 PSI and 10 GPM at 45 PSI, rather than requiring a pump and motor combination of about 40 GPM at 300 PSI driven substantially continuously to support the lubrication and other loading requirements such as the power shifting, the embodiments herein are fully capable of supporting the same loading tasks, but using only a pair of pumps and corresponding drive units providing 1 GPM at 300 PSI intermittently as needed, and 10 GPM at 45 PSI substantially continuously to support the lubrication and loading requirements, respectively. Operating in this mode the pumps 120, 150 of the example embodiment might draw or otherwise consume only about 1,000 Watts of power.

In accordance with the example embodiment, the first electric motor 172 of the hydraulic supply system 100 drives the first fluid pump 120 independently of the second electric motor 182. The first electric motor 172 of the hydraulic supply system 100 may drive the first fluid pump 120 as necessary or desired to support operation of the first functional system 19 of the work vehicle 1. Similarly, the second electric motor 182 of the hydraulic supply system 100 may drive the second fluid pump 150 as necessary or desired to support operation of the second functional system 29 of the work vehicle 1. In the example embodiment, the first hydraulic circuit 110 supplies hydraulic fluid power to the first functional system 19 including in the example embodiment the control 20 of the power shift transmission 22 of the work vehicle 1, and the second hydraulic circuit 112 supplies hydraulic fluid power to the second functional system 29 including in the example embodiment the set of one or more lubrication and cooling systems 30 of the work vehicle 1.

In the example, the pressure storage reservoir 130 of the hydraulic supply system 100 is an accumulator 132. The first electric motor 172 drives the first fluid pump 120 independently of the second electric motor 182 to generate the boost hydraulic fluid 134 by filling the accumulator 132 using the first hydraulic fluid 122.

In accordance with the example embodiment, the first electric motor 172 of the hydraulic supply system 100 is operable to drive the first fluid pump 120 in accordance with a pressure level of the reserve hydraulic power in the accumulator independent of a hydraulic power demand of the first functional system 19 comprising a shift control 20 for a power shift transmission 22 of the associated work vehicle.

For purposes of providing for the independent operational nature of the hydraulic circuits 110, 112, a control system 190 may be provided. The control system may be a simple spring-loaded pressure differential switch for regulating the pressure within the accumulator 132 such as by making or breaking electrical contact points with in the control switch. The control system 190 may be an electronic controller (not shown) including a processor and a memory storing logic executable by the processor to perform control one or more functions such as for example to perform a function to maintain the pressure within the accumulator w to above a desires set point.

As shown, the control system 190 is operably coupled with the first electric motor 172. A pressure sensor 192 operably coupled with the control system 190 is provided. The pressure sensor 192 is operable to sense a pressure of the reserve hydraulic fluid within the accumulator 132 and to generate a pressure signal 194 representative of the sensed pressure.

In accordance with the example embodiment, the control system 190 receives the pressure signal 194 and generates a command signal 196 representative of a magnitude of a difference between the sensed pressure and a desired pressure set point stored in the control system. The first electric motor 172 is responsive to the command signal 196 to drive the first fluid pump 120 to generate the first hydraulic fluid 122 in accordance with the command signal 196.

Figure 3:
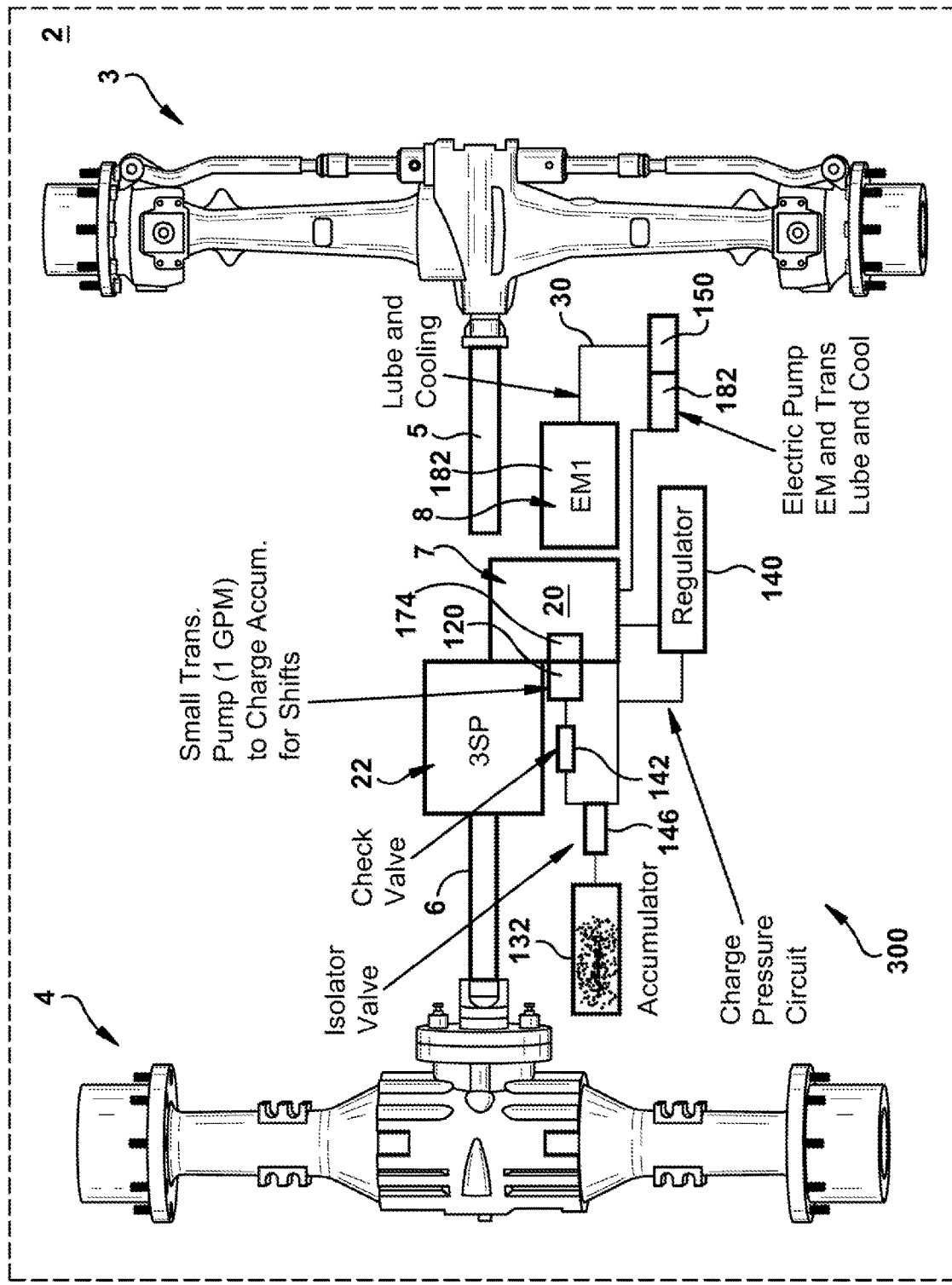
FIG. 3 is a schematic illustration showing a hydraulic supply system disposed in an associated work vehicle in accordance with an example embodiment.

FIG. 3 is a schematic illustration showing a hydraulic supply system 300 disposed in use in an associated farm tractor work vehicle 2 in accordance with an example embodiment. With reference now to that Figure, the portion of the work vehicle shown includes front and rear axles 3, 4 and a transmission 22 coupled with the front axle 3 by a front driveshaft 5 and coupled with the rear axle by a rear driveshaft 6. In the example embodiment, an interface device 174 operatively couples the first fluid pump 120 with an associated drivetrain component 7 of the associated work vehicle 2. The associated drivetrain component 7 is in turn coupled with a main drive motor 8 of the associated work vehicle 2. The main drive motor may be an electric motor wherein the work vehicle 2 of the example may be an "e-machine" (electric machine using one or more motor-generator pairs for power). An electric motor 182 is coupled with the second fluid pump 150. An interface device 174 is operable to drive the first fluid pump 120 to generate the first hydraulic fluid 122, wherein the electric motor 182 is operable to drive the second fluid pump 150 to generate the second hydraulic fluid 152 for use by the associated work vehicle 2 to operate the second functional system 29 of the work vehicle.

In the example, the interface device 174 drives the first fluid pump 120 by the associated drivetrain component 7 of the associated work vehicle independently of the electric motor 182 driving the second fluid pump 150.

Also in the example embodiment, the pressure storage reservoir 130 of the hydraulic supply system 300 comprises an accumulator 132. The interface device 174 drives the first fluid pump 120 independently of the electric motor 182 to generate the boost hydraulic fluid 134 by filling the accumulator 132 using the first hydraulic fluid 122.

Figure 4:
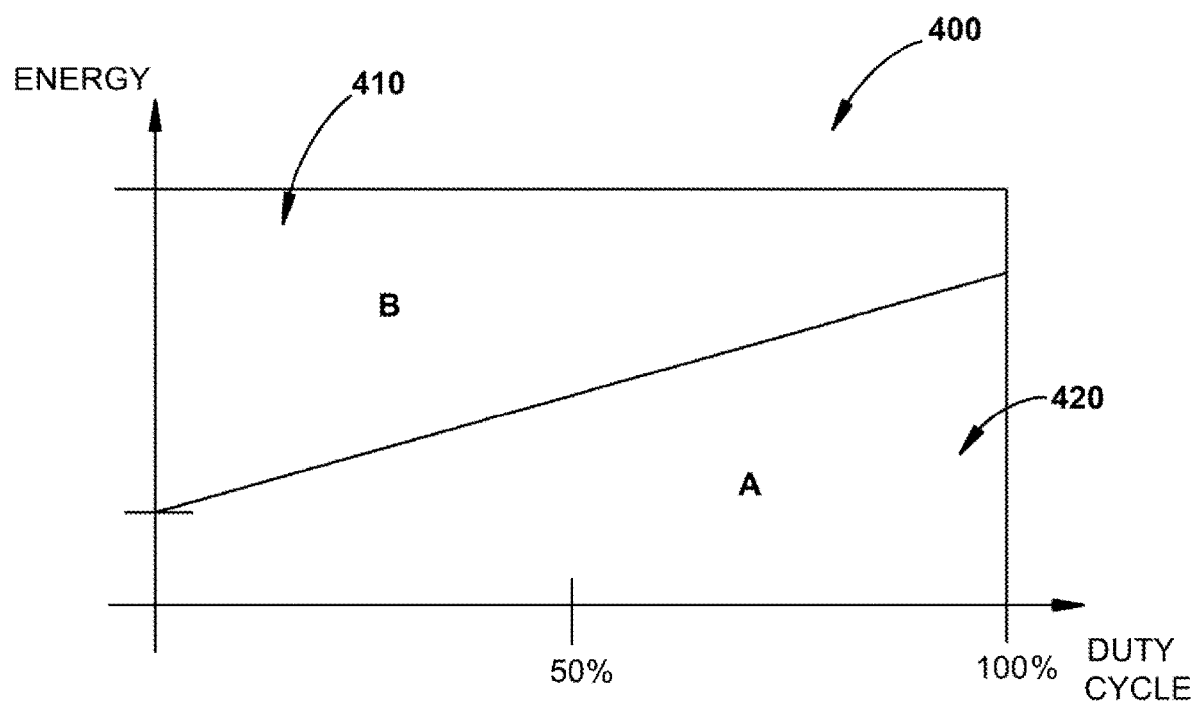
FIG. 4 is a schematic illustration showing a chart comparing energy saving efficiencies of the hydraulic supply system of the example embodiments relative to prior systems.

FIG. 4 is a schematic illustration showing a chart 400 comparing energy saving efficiencies of the hydraulic supply system of the example embodiments A relative to prior systems B. As described above with regard to the earlier systems, as a practically matter, the pump 12 of the hydraulic supply system 10 must be sized to support the possibly simultaneous demands of both the control 20 of the power shift transmission 22 as well as the lubrication and cooling system 30 such as may occur during heavy use of the vehicle when both systems might operate at full use or duty cycle. That is, the pump 12 is typically sized to deliver the aggregate of the maximum overall volumes required and also to deliver the aggregate of the maximum of the overall pressures required. In the particular example, the pump 12 is therefore sized to supply about 40 GPM at about 300 PSI. The regulator 13 regulates down this high volume, high pressure supply to the appropriate levels as may be required locally by the control 20 of the power shift transmission 22 and the lubrication and cooling system 30. The regulator dumps extra unused oil to a return 16 via a return line 17. Alternatively, the "extra" flow of the high volume pump can be dumped "over relief" and directed to line 31 to the lubrication and cooling system 30 to lubricate and potentially cool the transmission and thus removing the need for line 17. There is still a direct energy loss as this newly pressurized oil such as at, for example, 300 psi, is now dropped in pressure such as to, for example, 45 psi, and sent to the transmission 22 as low pressure lube and cooling flow. The energy of the pressure drop is converted to heat in the oil and thus may require additional cooling of the oil. Operating in this mode the pump 12 might draw or otherwise consume about 5,000 Watts of power. This relatively inefficient power consumption is shown in the Figure at 410.

However, in accordance with the example embodiments herein, for the given loads as set out in the example embodiment of 30 GPM at 300 PSI and 10 GPM at 45 PSI, rather than requiring a pump and motor combination of about 40 GPM at 300 PSI driven substantially continuously to support the lubrication and other loading requirements such as the power shifting, the embodiments herein are fully capable of supporting the same loading tasks, but using only a pair of pumps and corresponding drive units providing 1 GPM at 300 PSI intermittently as needed, and 10 GPM at 45 PSI substantially continuously to support the lubrication and loading requirements, respectively. Operating in this mode the pumps 120, 150 of the example embodiment might draw or otherwise consume only about 1,000 Watts of power. This efficient power consumption of the example embodiment is shown in the Figure at 420.

Figure 5:
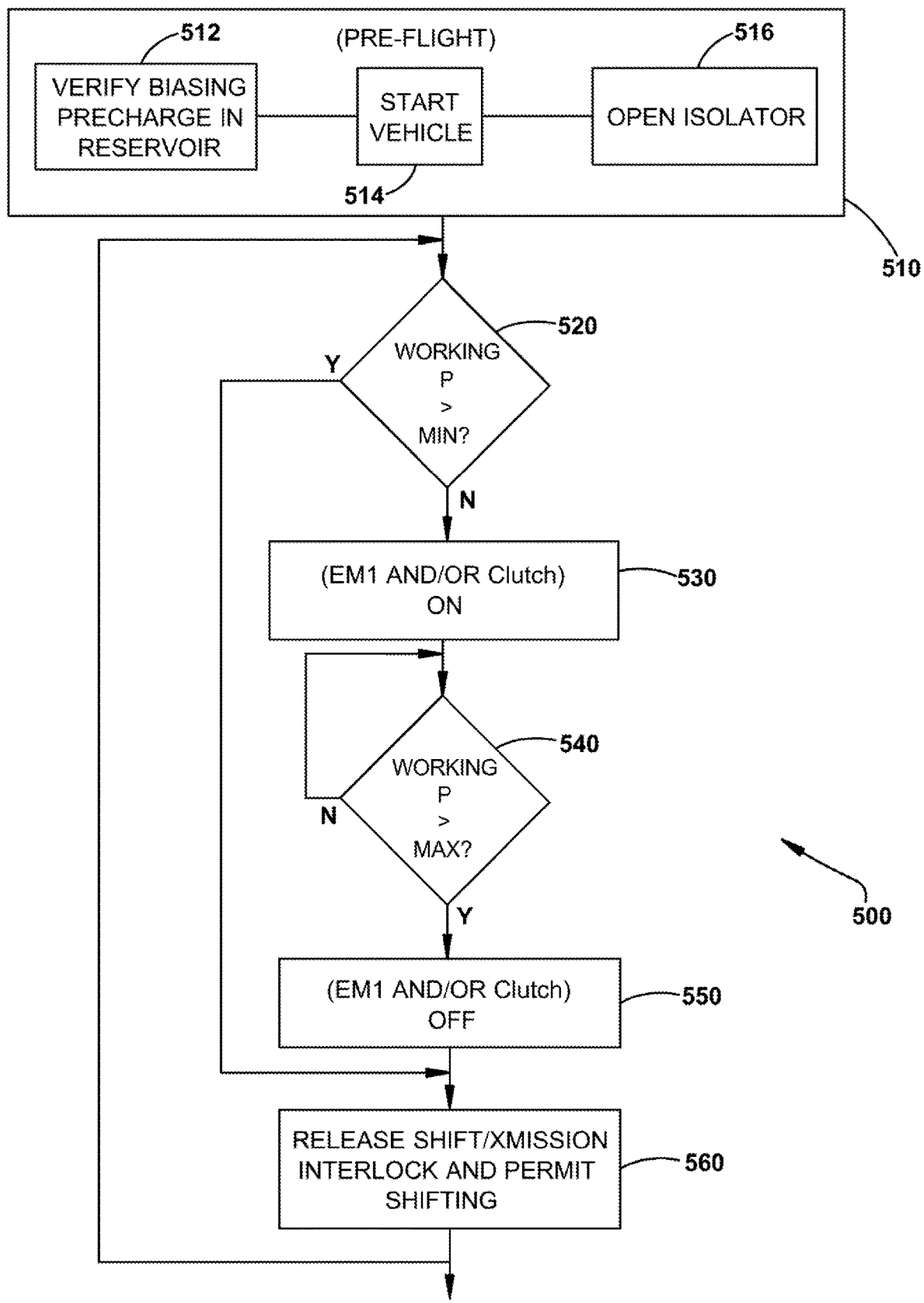
FIG. 5 is a flow diagram showing a method of operating the hydraulic supply system in accordance with an example embodiment.

FIG. 5 is a flow diagram showing a method 500 of operating the hydraulic supply system in accordance with an example embodiment. With reference now to that Figure, before the example embodiments of the hydraulic supply system 100, 300 are set into motion operationally, a pre-operation step 510 sets up the system for operation. In the per-operation step 510 includes a step of verifying the pre-charge in the reservoir in step 512. The pre-charge in the accumulator may be nitrogen gas set to a pressure of about 200-400 PSI, for example. The work vehicle is started in step 514 and the isolator valve 146 for isolating the pressure storage reservoir 130 from the remainder of the first hydraulic circuit 110 is operand at step 516.

The working pressure within the accumulator is checked in step 520 and compared against a minimum value MIN considered to be suitable to support the hydraulic power demand of the first functional system 19 comprising a shift control 20 for a power shift transmission 22 of the associated work vehicle. In accordance with the example embodiment, the minimum value MIN considered to be suitable to support the hydraulic is about 300 PSI.

If the pressure within the accumulator is greater than or equal to the minimum value MIN, the transmission interlock is released in step 560 permitting the vehicle operation. Otherwise, the first drive unit 170 operably coupled with the first fluid pump 120 is initiated in step 530 to drive the first fluid pump 120 to generate the first hydraulic fluid 122. In a particular example embodiment, the first drive unit 170 may be a first electric motor 172 powered by a source of electrical power (not shown) for example. In yet a further particular example embodiment to be described in greater detail below, the first drive unit 170 may include an interface device 174 (FIG. 3) operatively coupling the first fluid pump 120 with an associated drivetrain component of the associated work vehicle, wherein the interface device is operable to drive the first fluid pump 120 to generate the first hydraulic fluid 122.

The pressure within the accumulator is checked again in step 540 for reaching a maximum set point value MAX. If the pressure within the accumulator is greater than or equal to the maximum value MAX, the first drive unit 170 operably coupled with the first fluid pump 120 is disengaged if it is a clutch 174 (FIG. 3) or stopped if it is an electric motor 172 (FIG. 2) in step 550. Thereafter, the transmission interlock is released in step 560 permitting the vehicle operation. Alternatively, the flow of the small low volume pump can be dumped "over relief" and directed to the lubrication and cooling system 30 to lubricate and potentially cool the transmission 22. In addition, the first drive unit 170 may be or otherwise comprise a vehicle internal combustion engine that is directly coupled with the first fluid pump 120 to generate the first hydraulic fluid 122 pressure and flow at all times while running. Since the pump is a small volume and low energy demand pump, the energy required will be less than 1000 Watts, for example.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A hydraulic supply system operable to provide hydraulic power to functional systems of an associated work vehicle, the hydraulic supply system comprising:
   a first hydraulic circuit comprising:
      a first fluid pump operable to generate a first hydraulic fluid;
      a pressure storage reservoir coupled with the first fluid pump, the pressure storage reservoir being operable to store at least a portion of the first hydraulic fluid as a reserve hydraulic fluid; and a first port coupled with the first fluid pump and with the pressure storage reservoir, the first port being operable to deliver a boost hydraulic fluid from the first circuit for use by the associated work vehicle to operate a first functional system of the associated work vehicle, wherein the boost hydraulic fluid comprises one or more of the first hydraulic fluid and/or the reserve hydraulic fluid;

a first electric motor operable to drive the first fluid pump to generate the first hydraulic fluid;

a second hydraulic circuit comprising:

a second fluid pump operable to generate a second hydraulic fluid; and a second port coupled with the second fluid pump, the second port being operable to deliver the second hydraulic fluid from the second hydraulic circuit for use by the associated work vehicle to operate a second functional system of the associated work vehicle;

a control system operably coupled with the first electric motor; and a pressure sensor operable to sense a pressure of the reserve hydraulic fluid within the pressure storage reservoir and generate a pressure signal representative of the sensed pressure, wherein the control system is operable to receive the pressure signal and generate a command signal representative of a difference between the sensed pressure and a desired pressure set point stored in the control system, wherein the first electric motor is operable to drive the first fluid pump to generate the first hydraulic fluid based on the command signal.

2. The hydraulic supply system according to claim 1, further comprising:

a second electric motor coupled with the second fluid pump, wherein the second electric motor is operable to drive the second fluid pump to generate the second hydraulic fluid for use by the associated work vehicle to operate the second functional system of the work vehicle.

3. The hydraulic supply system according to claim 2, wherein the first electric motor drives the first fluid pump based on the command signal independently of the second electric motor.

4. The hydraulic supply system according to claim 3, wherein:

the pressure storage reservoir comprises an accumulator; and the first electric motor drives the first fluid pump independently of the second electric motor based on the command signal to generate the boost hydraulic fluid by filling the accumulator using the first hydraulic fluid.

5. The hydraulic supply system according to claim 4, wherein:

the first electric motor is operable to drive the first fluid pump based on the command signal independent of a hydraulic power demand of the first functional system.

6. The hydraulic supply system according to claim 5, wherein:

the first functional system comprises a shift control for a power shift transmission of the associated work vehicle; and the second functional system comprises a lubrication and cooling system of the associated work vehicle.

7. A hydraulic supply system operable to provide hydraulic power to an associated work vehicle, the hydraulic supply system comprising:

a first hydraulic circuit comprising:

a first fluid pump operable to generate a first hydraulic fluid;

a pressure storage reservoir operable to store a reserve hydraulic fluid comprising at least a portion of the first hydraulic fluid;

a first port coupled with the pressure storage reservoir, the first port being operable to deliver a boost hydraulic fluid from the first hydraulic circuit to the associated work vehicle, wherein the boost hydraulic fluid comprises one or more of the first hydraulic fluid generated by the first fluid pump and/or the reserve hydraulic fluid stored in the pressure storage reservoir;

an interface device operatively coupling the first fluid pump with an associated drivetrain component of the associated work vehicle, wherein the associated drivetrain component is operable to be driven by a main drive motor of the associated work vehicle to drive the first fluid pump via the interface device to generate the first hydraulic fluid; and a regulator circuit providing fluid flow control of the first hydraulic fluid and the reserve hydraulic fluid for regulating a pressure of the boost hydraulic fluid delivered to the associated work vehicle via the first port; and a second hydraulic circuit comprising:

a second fluid pump operable to generate a second hydraulic fluid;

a fluid circuit configured to deliver a lubrication and cooling hydraulic fluid to the associated drivetrain component and the main drive motor of the associated work vehicle; and an electric motor operable to drive the second fluid pump to generate a second hydraulic fluid for use by the associated work vehicle as the lubrication and cooling hydraulic fluid.

8. The hydraulic supply system according to claim 7, wherein the interface device is configured to be driven by the associated drivetrain component of the associated work vehicle to drive the first fluid pump for generating the first hydraulic fluid to maintain the pressure of the boost hydraulic fluid delivered to the associated work vehicle via the first port independently of the electric motor driving the second fluid pump.

9. The hydraulic supply system according to claim 8, wherein:

the pressure storage reservoir comprises an accumulator; and the interface device is configured to be driven by the associated drivetrain component of the associated work vehicle to drive the first fluid pump independently of the electric motor to generate the boost hydraulic fluid by filling the accumulator using the first hydraulic fluid.

10. The hydraulic supply system according to claim 9, wherein:

the first port is operable to deliver the boost hydraulic fluid from the first circuit to a first functional system of the associated work vehicle comprising a shift control for a power shift transmission of the associated work vehicle; and the second fluid pump is operable to generate the second hydraulic fluid for use by a second functional system of the associated work vehicle comprising a lubrication and cooling system of the associated work vehicle.

11. The hydraulic supply system according to claim 7, wherein:
the interface device of the first hydraulic circuit operatively couples the first fluid pump with the associated drivetrain component operable to be driven by the main drive motor of the associated work vehicle comprising an electric main drive motor to drive the first fluid pump to generate the first hydraulic fluid; and
the fluid circuit of the second hydraulic circuit is configured to deliver the lubrication and cooling hydraulic fluid to the electric main drive motor of the associated work vehicle.

12. A method of operating a hydraulic supply system to provide hydraulic power to functional systems of an associated work vehicle, the method comprising:
generating a first hydraulic fluid by driving a first fluid pump using a first electric motor;
storing a reserve hydraulic fluid in an accumulator coupled with the first fluid pump, the reserve hydraulic fluid comprising at least a portion of the first hydraulic fluid;
delivering a boost hydraulic fluid via a first port coupled with the first fluid pump and with the accumulator, the boost hydraulic fluid being for use by the associated work vehicle to operate a first functional system of the work vehicle, wherein the boost hydraulic fluid comprises one or more of the first hydraulic fluid and/or the reserve hydraulic fluid;
generating a second hydraulic fluid by operating a second fluid pump of the hydraulic supply system;
delivering the second hydraulic fluid via a second port coupled with the second fluid pump, the second hydraulic fluid being for use by the associated work vehicle to operate a second functional system of the work vehicle;
sensing by a pressure sensor a pressure of the reserve hydraulic fluid within the accumulator;
generating by the pressure sensor a pressure signal representative of the sensed pressure;
receiving the pressure signal by a control system;
generating by the control system a command signal representative of a difference between the sensed pressure and a demand pressure set point stored in the control system; and
driving the first fluid pump by the first electric motor responsive to the command signal to generate the first fluid for use by the hydraulic supply system as one or more of the reserve hydraulic fluid and/or the boost hydraulic fluid.

13. The method according to claim 12, wherein:
the generating the first hydraulic fluid comprises generating a volume of 1 gallon per minute (GPM) at a pressure of about 300 pounds per square inch (PSI); and
the generating the second hydraulic fluid comprises generating a volume of 10 GPM at a pressure of about 45 PSI.

14. The method according to claim 12, wherein:
the generating the second hydraulic fluid comprises driving the second fluid pump using a second electric motor,
wherein the first electric motor drives the first fluid pump independently of the second electric motor to generate the boost hydraulic fluid by filling the accumulator using the first hydraulic fluid.

15. The method according to claim 14, wherein:
the driving the first fluid pump using the first electric motor comprises driving the first fluid pump using the first electric motor in accordance with a pressure level of the reserve hydraulic fluid in the accumulator independent of a hydraulic power demand of the first functional system.

16. A method of operating a hydraulic supply system to provide hydraulic power to functional systems of an associated work vehicle, the method comprising:
driving a first fluid pump by an interface device operatively coupled with an associated drivetrain component of the associated work to generate a first hydraulic fluid, wherein the associated drivetrain component is operable to be driven by a main drive motor of the associated work vehicle;
storing a reserve hydraulic fluid in a pressure storage reservoir, the reserve hydraulic fluid comprising at least a portion of the first hydraulic fluid;
delivering a boost hydraulic fluid from the hydraulic supply system to a first functional system of the associated work vehicle the associated work vehicle via a first port operatively coupled with the pressure storage reservoir, wherein the boost hydraulic fluid comprises one or more of the first hydraulic fluid generated by the first fluid pump and/or the reserve hydraulic fluid stored in the pressure storage reservoir;
providing fluid flow control of the first hydraulic fluid and the reserve hydraulic fluid by a regulator circuit for regulating a pressure of the boost hydraulic fluid delivered to the first functional system of the associated work vehicle via the first port;
driving a second fluid pump by an electric motor to generate a second hydraulic fluid; and
delivering the second hydraulic fluid via a fluid circuit to a second functional system of the associated work vehicle comprising the associated drivetrain component and the main drive motor.

17. The method according to claim 16, wherein:
the driving of the first fluid pump comprises driving the first fluid pump by the interface device operatively coupled with the associated drivetrain component of the associated work vehicle to generate the first hydraulic fluid, wherein the associated drivetrain component is operable to be driven by the main drive motor of the associated work vehicle comprising an electric main drive motor; and
the delivering of the second hydraulic fluid comprises delivering the second hydraulic fluid via the fluid circuit to the second functional system of the associated work vehicle, the second functional system of the associated work vehicle comprising the electric main drive motor of the associated work vehicle.

18. A hydraulic supply system operable to provide hydraulic power to an associated work vehicle, the hydraulic supply system comprising:
a first hydraulic circuit comprising:
a first fluid pump operable to generate a first hydraulic fluid;
a pressure storage reservoir coupled with the first fluid pump, the pressure storage reservoir being operable to store at least a portion of the first hydraulic fluid received from the first fluid pump as a reserve hydraulic fluid;
a pressure sensor operable to sense a pressure of the reserve hydraulic fluid within the pressure storage reservoir and generate a pressure signal representative of the sensed pressure;

a control system operable to receive the pressure signal and generate a command signal representative of a difference between the sensed pressure and a desired pressure set point stored in the control system, wherein the first fluid pump is operable to be driven based on the command signal to generate the first hydraulic fluid; and a first port coupled with the first fluid pump and with the pressure storage reservoir, the first port being operable to deliver a boost hydraulic fluid from the first circuit for use by the associated work vehicle to operate a shift control for a power shift transmission of the associated work vehicle, wherein the boost hydraulic fluid comprises one or more of the first hydraulic fluid and/or the reserve hydraulic fluid; and a second hydraulic circuit comprising:

a second fluid pump operable to generate a second hydraulic fluid; and a second port coupled with the second fluid pump, the second port being operable to deliver the second hydraulic fluid from the second hydraulic circuit for use by the associated work vehicle to operate a lubrication and cooling system of the associated work vehicle.

19. The hydraulic supply system according to claim 18, further comprising:

a first electric motor coupled with the first fluid pump; and a second electric motor coupled with the second fluid pump, wherein the first electric motor is operable to drive the first fluid pump to generate the first hydraulic based on the command signal independently of the second hydraulic circuit, wherein the second electric motor is operable to drive the second fluid pump to generate the second hydraulic fluid for use by the associated work vehicle to operate the a lubrication and cooling system of the associated work vehicle.

* * * * *